Patented Oct. 9, 1945

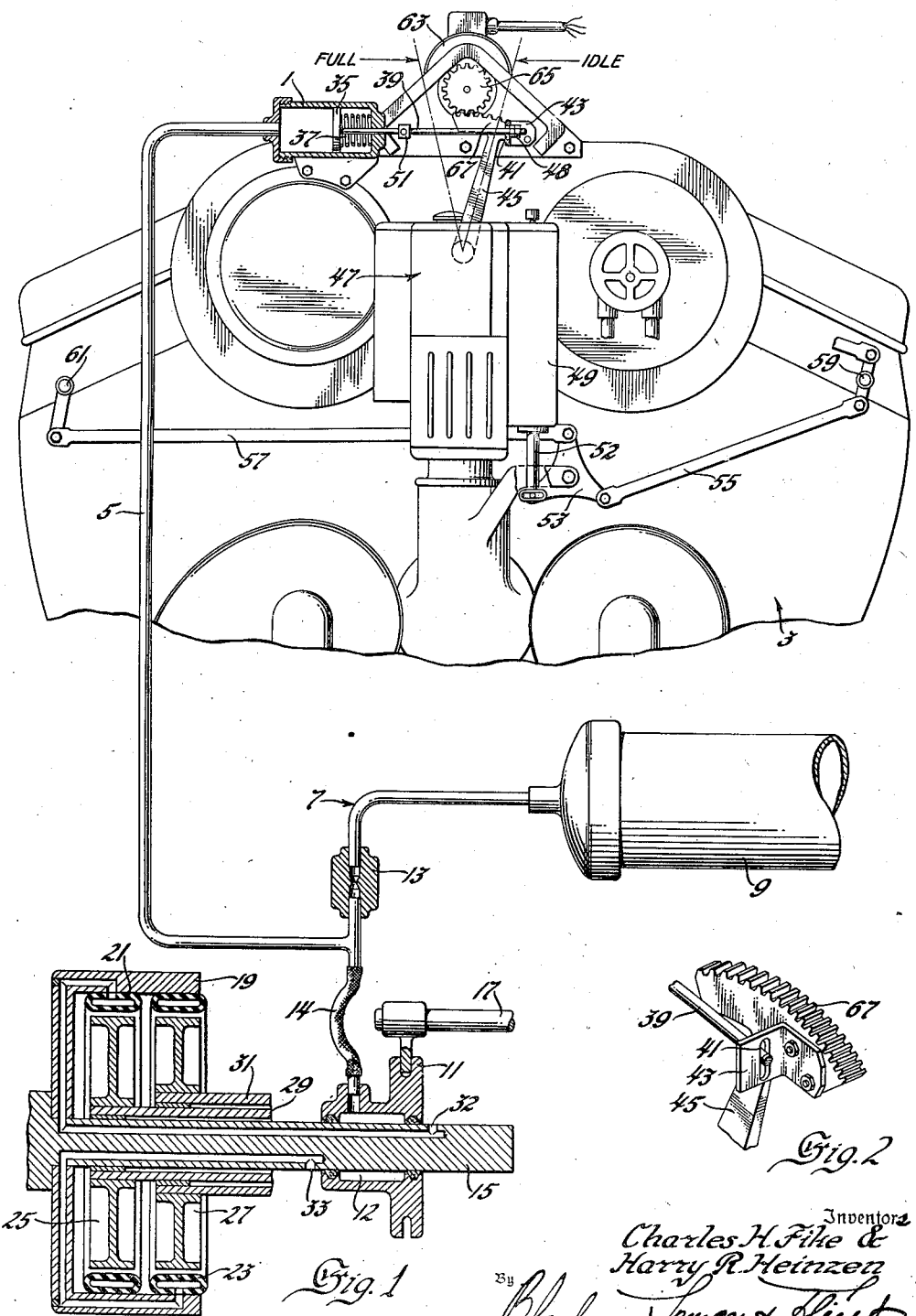

2,386,392

UNITED STATES PATENT OFFICE 2,386,392

ENGINE SPEED CONTROL SYSTEM

Charles H. Fike and Harry R. Heinzen, Cleveland, Ohio, assignors to General Motors Corporation, Detroit, Mich., a corporation of Delaware Application June 26, 1944, Serial No. 542,168

7 Claims. (Cl. 192—.01)

The present invention generally relates to speed controlling systems for prime movers and more particularly relates to a prime mover speed controlling mechanism including means acting in response to engagement of a clutch driven by the prime mover to cause an increase in the speed thereof during clutch engagement to prevent stalling of the prime mover.

In driving systems where the prime mover is directly connected to a load shaft by a clutch and where the load shaft must be driven at variable speeds ranging from the idling speed value of the prime mover to maximum value, stalling of the prime mover frequently occurs when the clutch is engaged at idling speed. In order to obtain low starting speed of the load shaft without stalling of the prime mover it is necessary to provide a clutch which is capable of gradual engagement and to increase the speed of the prime mover during engagement. Where rapid clutch operation is required to obtain prompt reverse drive of ships driven by a prime mover directly connected to a propeller shaft by means of ahead and astern driving clutches and reverse gearing it is necessary to promptly reduce the fuel supplied to the prime mover to a low value, disengage one clutch, engage the reverse drive clutch and increase the fuel supply upon engagement thereof to prevent stalling of the prime mover for the reason that the engine speed cannot be reduced suddenly due to the flywheel effect of the rotating parts of the engine, engaged clutch, gearing and propeller shaft and as these parts are then driven by the propeller by the headway of the ship until disengagement of the clutch occurs. In order to provide dead slow ahead and astern speed and prompt reversal of drive it is therefore necessary to provide means for increasing the fuel supply of the prime mover in response to engagement of either the ahead or astern driving clutch.

The object of the present invention is to provide a simple control mechanism which acts in response to engagement of a driving clutch to increase the fuel supplied to the prime mover driving the clutch to prevent stalling of the prime mover.

The control mechanism by which the object of the present invention is accomplished will become apparent by reference to the following detailed description and drawing illustrating one form of ring control system as applied to a Diesel engine and reversing gear propulsion unit for a ship, for which the control system is particularly adapted.

Figure 1 of the drawing is a diagrammatic view of the control system and

Figure 2 is a perspective view of a detail of one element thereof.

As best illustrated in Figure 1 the control system comprises a power control cylinder 1 secured on a Diesel engine generally indicated at 3 and connected by a pipe 5 to a pressure supply line generally indicated at 7 extending between a pressure reservoir 9 and a clutch reversing control valve 11. A restriction 13 for limiting the flow of pressure fluid is connected in the pressure supply line between the reservoir 9 and pipe 5 and the clutch control valve 11 is connected to the supply line by a flexible tube 14 to permit longitudinal movement of the valve in either direction from a central position along a clutch driving shaft 15 by means of a control rod 17. The clutch driving shaft 15 is adapted to be directly connected to and driven by the engine 3. A clutch driving drum 19 is secured to the shaft 15 and two annular clutch tubes 21 and 23 are secured to the inner periphery of the drum. Each of these tubes are distensible by fluid pressure to engage respective clutch driven drums 25 and 27 secured to separate hollow driven shafts 29 and 31 which are rotatably supported in concentric relation on the driving shaft 15. The driven shafts 29 and 31 are adapted to be connected by means of suitable forward and reverse gearing to a ship's propeller shaft, not shown, to cause ahead rotation thereof upon engagement of the clutch driven drum 25 by the tube 21 and astern rotation upon engagement of the clutch driven drum 27 by the tube 23. Separate connecting passages are provided in the drum 19 and shaft 15 between the interior of each tube and a separate port provided in the driving shaft. These ports 32 and 33 are spaced longitudinally either side of the control position occupied by control valve 11. The reservoir 9 is adapted to be connected to a suitable compressor and pressure regulator, not shown, so that substantially constant pressure is maintained in the reservoir. The pressure in control cylinder 1 and in the cavity 12 of the control valve 11 connected to the reservoir through the pipe 5, tube 14, flow restriction 13 and supply line 7 is accordingly equal to the pressure in the reservoir when the control valve 11 is in the control position shown, between the ports 32 and 33 in the clutch driving shaft 15 in which position the clutch tubes 21 and 23 are vented to atmosphere through these ports and are disengaged from the clutch driven drums 25 and 27.

Movement of the control valve 11 by the control rod 17 in either direction from that shown so that the cavity 12 therein is in register with either the port 32 or 33 in the shaft 15 permits unrestricted flow of pressure from the control cylinder 1 and restricted flow of pressure through the restriction 13 from the reservoir to and through the control valve cavity 12 to either the clutch tube 21 or 25. It will be evident that a drop in pressure will accordingly occur in the pipe 5 and control cylinder 1 during inflation of either clutch tube until the pressure in the tube and cylinder is again increased to that in the reservoir by flow of pressure thereto from the reservoir through the restriction 13. When either tube is inflated to a pressure equal to that in the reservoir full pressure engagement of either clutch tube with either driven clutch drum 25 or 27 will occur to establish ahead or astern drive of the propeller shaft.

A piston 35 is slidably mounted in the power control cylinder 1 and the pressure applied to one side thereof through the pipe 5 tends to urge the piston to the right in the cylinder against the pressure exerted by an equalizing spring 37 in the cylinder acting on the other side of the piston. When the pressure in the control cylinder is equal to the reservoir pressure the force on one side of the piston is equal to the opposing force exerted on the other side of the piston by the equalizing spring and the piston is accordingly normally held in the position shown intermediate the ends of the cylinder. A piston rod 39 is secured to the piston 35 and extends outwardly from the cylinder and projects through a slot 41 in a bracket 43 secured to the speed setting lever 45 of an engine governor, indicated generally at 47. The outer end of the piston rod 39 is threaded and adjusting and locking nuts 48 are threaded thereon to cause movement of the governor speed setting lever 45 from the idle speed setting position, shown, toward the full speed setting position upon movement of the piston 35 to the left by the spring 37 upon a reduction in pressure in the control cylinder below that of the reservoir as a result of inflation of either clutch tube in the manner previously described. A limit stop 51 is adjustably secured to the piston rod 39 to limit inward movement thereof by contact with the cylinder.

The engine governor 47 is of a well known type having conventional engine driven fly weights for operating a pilot valve to cause movement of a plunger 52 of a hydraulic power cylinder 49 provided on the governor in response to variations in speed and load of the engine. The speed setting lever 45 varies the loading of the governor speeder spring to vary the speed response of the governor in a well known manner and the speeder spring normally urges the speed setting lever 45 to the idle speed setting position shown. The power plunger 52 is connected by a pivoted bell crank lever 53 and links 55 and 57 to the engine fuel control shafts 59 and 61 to vary the fuel supplied to the engine in a well known manner in response to variations in load and speed thereon to cause operation of the engine at substantially constant speed for each speed setting position of the speed setting lever 45. A receiver motor 63 is mounted on the engine 3 and is connected by means of a gear 65 to a rack portion 67 of the speed setting lever 45 so that the lever may be moved in conventional manner to any position between idle and full speed setting positions in response to movement of a suitable transmitter speed controller, not shown, located remotely with respect to the receiver motor and operable manually in a well known manner.

With the elements of the control system in the position shown, movement of the control valve 11 in either direction to cause inflation of either the clutch tube 21 or 23 permits unrestricted flow of pressure fluid from the control cylinder 1 through the pipe 5 and tube 14 to either of the clutch tubes and a restricted flow of pressure from the reservoir 9 through the pressure line 7, restriction 13 and tube 14. The flow of pressure fluid from the cylinder 1 causes a drop of pressure therein and the equalizing spring 37 accordingly causes movement of the piston 35 to the left in the cylinder. This movement causes the nuts 48 on the piston rod 39 to engage and move the speed setting lever 45 away from the idle speed setting position toward the full speed setting position an amount determined by the limit stop 51 on the piston rod. The governor speed setting is accordingly increased and the governor 47 acts to cause movement of the plunger 52 in the power cylinder 49 and movement of the engine fuel control shafts 59 and 61 connected thereto by the lever 53, and links 55 and 57 to cause an increase in the fuel supplied to the engine and the speed thereof an amount necessary to prevent stalling of the engine during engagement of either clutch. Upon a rise in pressure in the clutch tube and control cylinder 1 to a value equal to that in the reservoir 9 by the restricted flow of pressure therefrom, determined by the area of the restriction 13 in the supply line 7, the piston 35 will move to the right in the control cylinder 1 to its original position until the force of the spring 37 on the piston is equal to the pressure applied to the other side of the piston. The speed setting lever 45 will accordingly be returned to the idle speed setting position by the governor speeder spring upon return movement of the piston rod 39 and nuts 48 thereon to the normal position with respect to the speed setting lever.

It will be evident that the extent and rate of movement of the piston 35 from and back to the normal position and therefore the time interval required for this movement may be varied by adjusting of the nuts 48 and limit stop 51 on the piston rod 39 and by proper selection of the rate of the spring 37 and area of the restriction 13 to take care of different inflation and deflation characteristics of the clutch tubes 21 and 23 and different accelerating and decelerating characteristics of the engine in response to increase or decrease in the fuel supplied thereto by movement of the speed setting lever 45. It will also be apparent that upon shut down of the engine and leakage of pressure from the reservoir the spring 37 will move the piston 35 and piston rod 39 to the left and cause movement of the speed setting lever toward the full speed setting position so that the engine may be readily restarted.

The control arrangement described above enables the establishment of dead slow speed ahead or astern drive without stalling of the engine and also enables the engine speed controls and clutch control valve to be operated as promptly as possible to obtain prompt reversal of drive without stalling of the engine.

We claim:

1. A control system for an engine having speed controlling means and a fluid pressure engaged clutch driven by said engine, said control system including a pressure supply line connected to said clutch and including a pressure application control valve and means acting in response to a drop in pressure in said supply line upon application of pressure to said clutch for operating said engine speed controlling means during clutch engagement to cause an increase in the engine speed and thereby prevent engine stalling.

2. A control system for an engine having speed controlling means and a fluid pressure engaged clutch driven by said engine, said control system including a pressure supply line for said clutch including a pressure application control valve for said clutch, means acting in response to a drop in pressure in said line for operating the engine speed controlling means to cause an increase in the engine speed during application of pressure to said clutch to prevent stalling of said engine upon clutch engagement and means for restricting the flow of fluid pressure to said valve and pressure drop responsive means to control the action thereof.

3. A control system for an engine having means for controlling the speed thereby and a running gear driven by the engine and having pressure engaged clutches selectively operable for causing forward or reverse drive, said control system comprising a source of pressure, a control valve connected between said pressure source and said clutches, said valve being selectively operable for controlling application and relief of pressure of each of said clutches, a control cylinder connected between said control valve and pressure source, a piston and spring in said cylinder, and a one-way lost motion connection between said piston and engine speed controlling means to cause an increase in the engine speed by movement of said piston by said spring upon a drop in pressure in said control cylinder during application of pressure and engagement of either of said clutches by operation of said control valve.

4. A control system for an engine having means for controlling the speed thereof and fluid pressure engaged forward and reverse driving clutches driven by said engine, said control system comprising a fluid pressure supply line for said clutches, said supply line including a reversing valve selectively operable for controlling application and relief of pressure to either of said clutches to cause engagement or disengagement thereof and pressure responsive means acting upon a drop in pressure in said supply line upon application of pressure to either clutch for operating said engine speed controlling means to prevent stalling of said engine during clutch engagement.

5. A control system for an engine having speed controlling means and fluid pressure engaged forward and reverse driving clutches driven by said engine, said control system comprising a fluid pressure supply line for said clutches, said supply line including a reversing control valve selectively operable to control the application or relief of pressure to either clutch to cause engagement or disengagement thereof, means acting in response to pressure drop in said supply line upon application of pressure to either clutch for operating said engine speed controlling means only during engagement to prevent engine stalling and means for restricting the flow of pressure to said valve and pressure drop responsive means to control the action of said means and engagement of either clutch.

6. A control system for an engine having means for controlling the speed thereof and fluid pressure distensible and engageable forward and reverse driving clutch elements driven by said engine, said control means comprising a source of fluid pressure, a fluid pressure supply line for said clutches including a reversing valve selectively operable for controlling application or relief of pressure to either clutch to cause engagement or disengagement thereof, and a control cylinder including a spring biased piston adapted to move said engine speed controlling means only upon a drop in pressure in said supply line upon application of pressure to and engagement of either clutch in order to prevent engine stalling and means for limiting the movement of said engine speed controlling means by said piston during clutch engagement.

7. A control system for an engine having speed controlling means and fluid pressure distensible and engageable forward and reverse driving clutch elements driven by the engine, said control means comprising a source of fluid pressure, a fluid pressure supply line for said clutches including a reversing valve selectively operable for controlling application and relief of pressure to either clutch to cause engagement or disengagement thereof, a control cylinder including an equalizing spring and a piston adapted to operate said engine speed controlling means upon a reduction in pressure in said pressure supply connection upon application of pressure to either clutch during clutch engagement, and means for restricting the flow of pressure to said reversing valve and control cylinder to control the flow and, therefore, the pressure drop in the supply line to either clutch and the rate of clutch engagement, motion limiting means for said piston, and means normally urging said engine speed controlling means to a low speed controlling position.

CHARLES H. FIKE.
HARRY R. HEINZEN.